United States Patent [19]
Reed et al.

[11] Patent Number: 6,021,274
[45] Date of Patent: Feb. 1, 2000

[54] AUTOMATED DATA DISTRIBUTION SYSTEM AND METHOD FOR MASSIVELY PARALLEL PROCESSES

[75] Inventors: Christopher W. Reed, Los Angeles; Gregory D. Bolstad, Orange, both of Calif.

[73] Assignee: Raytheon Company, Lexington, Mass.

[21] Appl. No.: 08/769,907

[22] Filed: Dec. 19, 1996

[51] Int. Cl.[7] ....................................................... G06F 9/45
[52] U.S. Cl. ............................................................. 395/706
[58] Field of Search ....................................... 395/706, 705, 395/709, 672, 680, 553, 820.1, 820.04, 820.18, 820.23, 820.24, 820.28; 709/3, 400, 102, 104, 105, 106; 712/10, 4, 18, 23, 24, 28; 710/100

[56] References Cited

U.S. PATENT DOCUMENTS

| | | | |
|---|---|---|---|
| 5,410,696 | 4/1995 | Seki et al. | 395/706 |
| 5,450,313 | 9/1995 | Gilbert et al. | 395/709 |
| 5,485,612 | 1/1996 | Ota et al. | 709/100 |
| 5,535,393 | 7/1996 | Reeve et al. | 395/706 |
| 5,586,256 | 12/1996 | Thiel et al. | 710/100 |
| 5,737,623 | 4/1998 | Liebrock | 712/13 |

*Primary Examiner*—John A. Follansbee
*Attorney, Agent, or Firm*—Leonard A. Alkov; Glenn H. Lenzen, Jr.

[57] ABSTRACT

A system (80) for automating data distribution for parallel processor applications adapted for use with massively parallel processors. The system (80) includes high level instructions for obtaining user inputs (75) that specify system size and memory characteristics for a parallel processor. The instructions include routines (88, 92, 96, 102, 104, and 108) that communicate data among processing elements in the parallel processor in response to steps (62, 64) in an application running on each processing element in the parallel processor. The data communications are performed in accordance with the system size and memory characteristics obtained from the user. Additional routines (92, 96, 102, 104) synchronize the communication of data among processing elements (PEs) with the steps in the application.

9 Claims, 4 Drawing Sheets

AUTOMATED DATA DISTRIBUTION SYSTEM AND METHOD FOR MASSIVELY PARALLEL PROCESSES

BACKGROUND OF THE INVENTION

1. Field of Invention

This invention relates to parallel processing systems. Specifically, the present invention relates to systems for facilitating inter-processor communications for massively parallel processing systems.

2. Description of the Related Art

Massively parallel processors are used in a variety of applications ranging from flight simulators to supercomputer engineering applications. Programs written for these parallel processors require accurate data transfer and synchronization between processors and processing steps.

In a massively parallel environment, program execution is shared among multiple processors. Steps in an algorithm are mapped to sets of processors in the system. Each step is synchronized with other steps performed on different processors. Data required for the steps is often distributed differently for each step. Each step is performed on all processors except for those processors into which no data is mapped. Mapping descriptions that specify the data distribution and synchronization for each step in the algorithm quickly become large and unwieldy as systems and algorithms become larger. As the number of mappings increases, so does system design time, and debugging complexity. This results in expensive, time consuming development cycles for parallel processing applications.

To reduce the time and costs associated with the development of massively parallel applications, specialized message passing libraries were developed. Applications written using these libraries were often slow, error prone, difficult to debug, and not scaleable. Typically software must be must be rewritten when transporting applications between parallel processing systems of different sizes. This makes programming for massively parallel applications expensive and time consuming. Also, the relatively low level of abstraction that these libraries provide make application design difficult and tedious.

Hence, a need exists in the art for a high level system for massively parallel applications that facilitates data distribution among processors. There is a further need for a high performance system that facilitates parallel application debugging and the creation of fast, scaleable applications for massively parallel processors.

SUMMARY OF THE INVENTION

The need in the art is addressed by the system for automating data distribution for parallel processing applications of the present invention. In the illustrative embodiment, the inventive system is adapted for use with a massively parallel processor and includes high level instructions for obtaining user inputs that specify system size and memory characteristics for the parallel processor. The instructions include library routines for communicating data among processors in the parallel processor in response to steps in an application running on the parallel processor. The data communications are performed in accordance with the system size and memory characteristics obtained from the user. Additional routines synchronize the communication of data among processors with the steps in the application.

In a specific embodiment, instructions are implemented in software running on the parallel processor. The user inputs specify data distribution parameters and a library routine generates a data map that specifies the layout of data in each processor memory in accordance with the data distribution parameters. Another routine generates a communication map that specifies inter-processor communications required between a first algorithm step and a second algorithm step in the application in accordance with the data map. An additional routine generates commands in accordance with the communication map for redistributing the data prior to the second algorithm step and for synchronizing data communications between processors. These commands are stored in a programming language structure included in software of the present invention. The processor stores these commands and performs the data communications with the aid of a direct memory access engine.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The following review of a typical parallel processor is intended to facilitate an understanding of the present invention.

Figure 1:
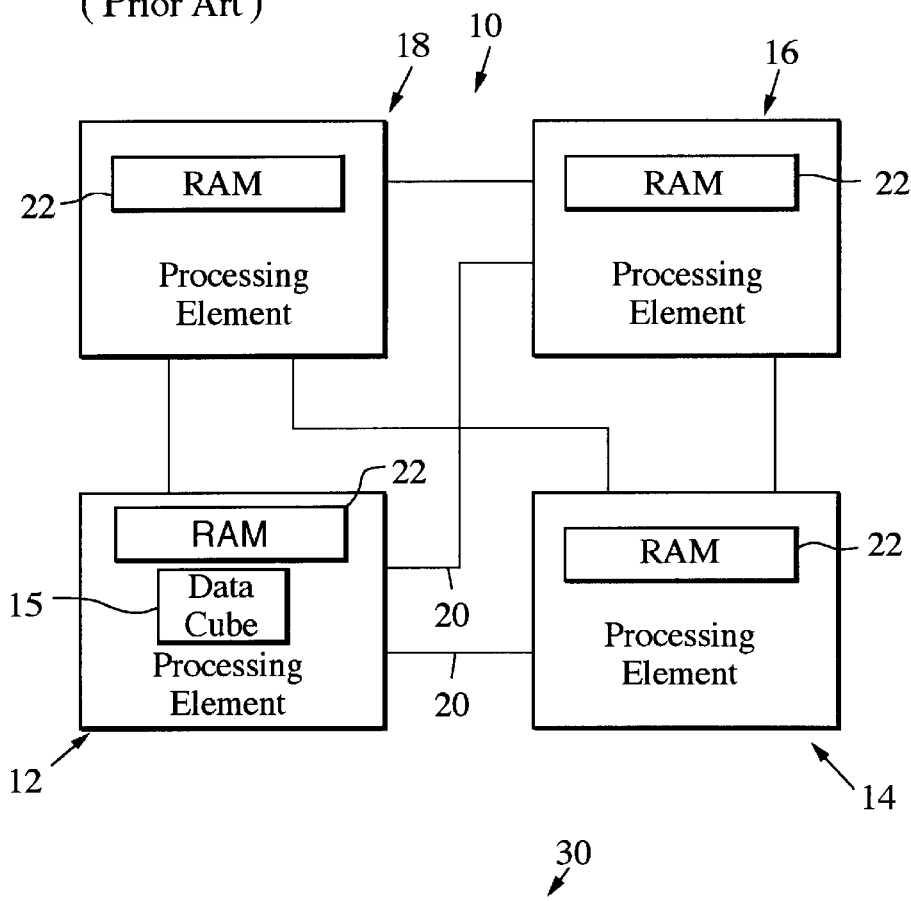
FIG. 1 is a diagram of a typical parallel processor.

FIG. 1 is a diagram of a typical parallel processor 10. The parallel processor 10 is an array of interconnected processing elements (PEs) 12, 14, 16, and 18. Data required for the execution of the application is stored in PE memory shown as a data cube 15 for illustrative purposes. Those skilled in the art will appreciate that the data cube 15 is typically distributed across all of the processing elements 12, 14, 16, and 18.

For a particular step in the application, an appropriate piece of the data cube 15 must be assigned to each PE or reassigned among the PEs 12, 14, 16, and 18. This assignment must be timed with the other steps performed in the application. Inter-connecting bus lines 20 facilitate such assignments, i.e., data transfers.

Each PE 12, 14, 16, and 18, i.e., PE, has a section of random access memory (RAM) 22 reserved for these data transfers. Data in RAM 22 must often be reorganized in accordance with application steps being performed by the particular processor 12, 14, 18, and 22. Typically instructions for data transfers, the synchronization of data transfers with application steps, and the reorganization of each PE's RAM 22 is coded into the application software running on the processing elements 12, 14, 16, and 18. This is a tedious process that often results in applications that are slow and difficult to debug.

Figure 2:
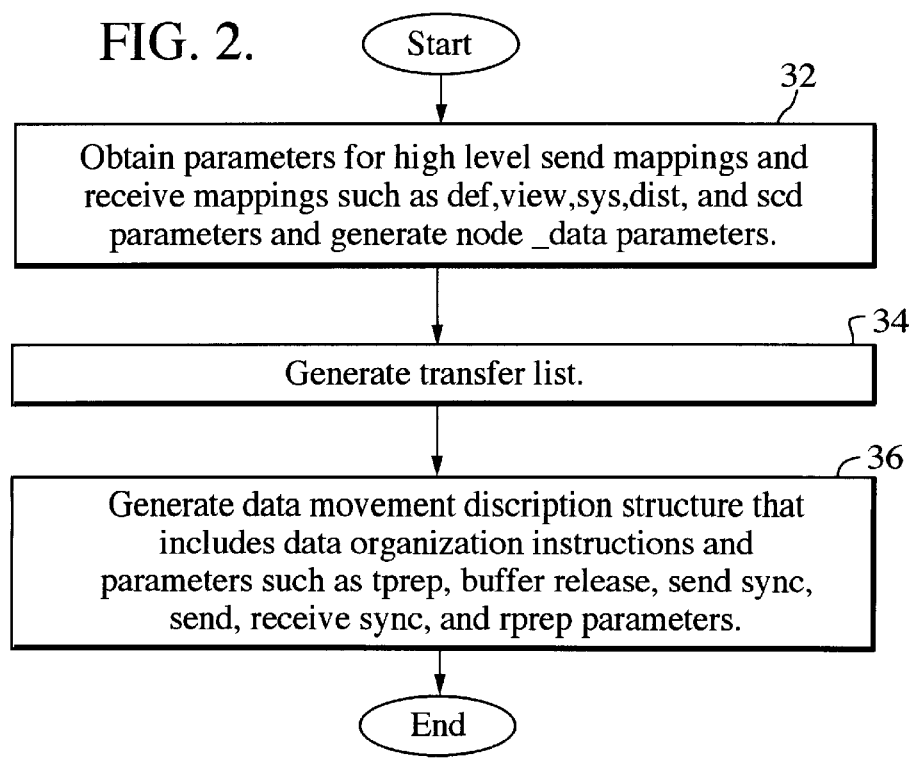
FIG. 2 is a flow diagram illustrating the use of data mappings and user input parameters to generate data transfer and synchronization instructions in accordance with the teachings of the present invention.

FIG. 2 is a flow diagram 30 illustrating the use of data mappings and user input parameters to generate data transfer and synchronization instructions in accordance with the teachings of the present invention. The flow diagram 30 illustrates tasks performed during system initialization which occur before running a given application.

In a first task 32, user inputs are obtained which describe, in a high level manner, system size characteristics, PE RAM characteristics, and how data is distributed among PEs in the parallel processor (see FIG. 1). In the present specific embodiment, the user inputs include def, view, sys, dist, and scd parameters and are input into the processor 10 of FIG. 1 via high-level software constructed in accordance with the teachings of the present invention and obtainable from Hughes Aircraft Company. In the first task, the software also generates node_data parameters.

The node_data parameters are calculated by a given PE and are relevant only to that PE. A given data set is mapped to the PE for a given step in an application. This data set is used to calculate the node_data parameters which include information such as data set size and data set offset, and any relevant pointers to data buffers.

The def parameters describe the full data cube (see FIG. 1). The def parameters remain the same for different mappings of the same data set and do not need a mapping number subscript. The view parameters describe a subset of the full data cube to be mapped to the processor for a particular mapping number that varies from one mapping of a data set to another. The sys parameters describe the physical system to which the data set is mapping.

Information about the physical range and location of a group of PEs that a given data subset should be mapped to and the organization of the PEs within the group are defined. These parameters may change from one mapping of a data set to another during runtime.

The dist parameters define exactly how data is spread onto the processor. For example, with a two dimensional processor array, this parameter may specify to spread a first type of data in one dimension and a second type of data in the other dimension.

The scd parameters describe how data should be organized in each of the PE's RAM rather than describing the actual data allocated to each PE.

In a second task 34, the high level software generates a transfer list from the descriptive parameters (def, view, sys, dist, scd, node_data) input in the first task 32. The transfer list specifies the piece of the data cube (see FIG. 1) that is to be received by each PE in the processing array. It also specifies the data that each PE must send and the addresses of the memory locations to where the data should be sent. The transfer list specifies how to spread data.

In the third task 36, the high level software generates a data movement description structure that provides a global picture of how data is to be spread among the PEs before and after a given application step. In the present specific embodiment, the data movement description structure is a C programming language structure. However, those skilled in the art will appreciate that another type of structure may be used for this purpose without departing from the scope of the present invention.

The data movement description structure includes a variety of parameters that correspond to data transfer and synchronization instructions. These parameters include transmit and prepare parameters (tprep parameters), buffer release, send synchronization (send sync parameters), receive synchronization (recv sync parameters), and receive preparation parameters (rprep). These parameters are generated during application initialization and provide data transfer and synchronization instructions as each processing step or function is performed during runtime. By storing the elements of the data movement description structure in a C structure, the elements of the structure may be defined and/or changed at runtime. This allows same object code to be used for systems and data of many different sizes, increasing the flexibility and applicability of the present invention. Also, this added scale-ability facilitates application design. The present invention also isolates programming tasks from data transfer and synchronization tasks that typically accompany programming for parallel and massively parallel computers, facilitating application programming and debugging.

When transporting the system of the present invention to parallel processors of different sizes, only different user inputs are required. This obviates the need to rewrite software. In addition, the use of a structure facilitates the handling of data having multi-mode radar signal processors. In such processors, the size of data sets may vary. Different modes may have vastly different data set sizes. By specifying a data distribution in a high-level manner, there is no re-write software for these applications.

Figure 3:
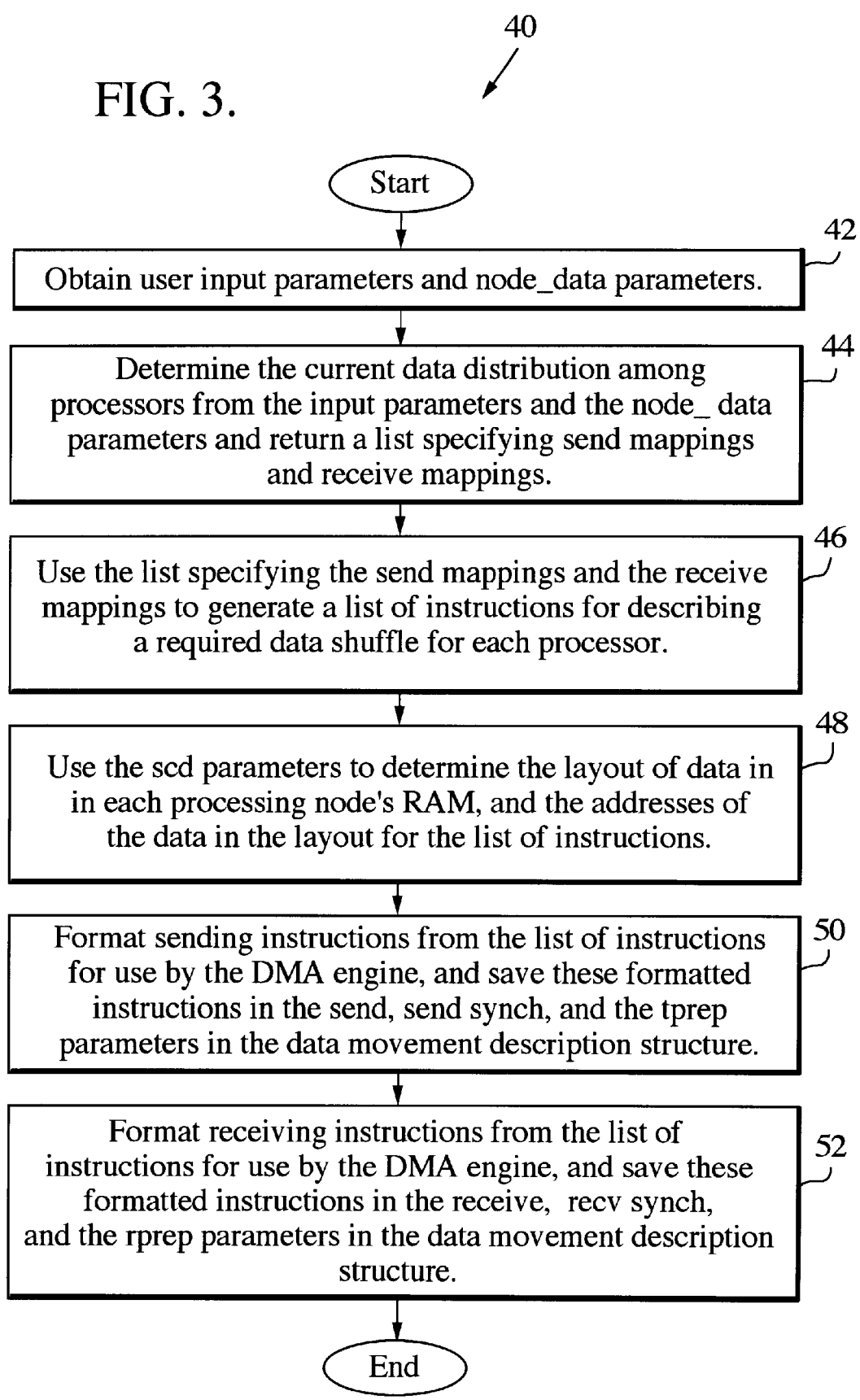
FIG. 3 is a flow diagram showing the key functional blocks of a function for generating the transfer list, data movement description structure, and synchronization instructions of FIG. 2.

FIG. 3 is a flow diagram 40 showing the key functional blocks of the high level software (sml_mcos_xfer_gen( )) for generating the transfer list, data movement description structure, and synchronization instructions of FIG. 2. The key functional blocks of the software are performed by the Scalable Mapping Library function sml_mcos_xfer_gen( ) and associated subroutines obtainable from Hughes Aircraft Company in California.

After obtaining the user input parameters (def, view, sys, dist, scd) and the node_data parameters in a first task 42, sml_mcos_xfer_gen( ) calls a subroutine that obtains current data distribution parameters from the input parameters (view, sys, dist) in a second task 44. The subroutine returns a list for a send mapping and a list for a receive mapping specifying the data assigned to each PE. The send mappings and receive mappings correspond to mappings before data is transferred and after data is transferred for a particular application step respectively. In the simplest case, the subroutine calculates these mappings by dividing the size of the processor array over the number of PEs in each dimension before and after the proposed data transfer.

In a third task 46, a second subroutine is called. The subroutine uses the send mapping and receive mapping parameters obtained from the second task 44 to generate a list of instructions and/or parameters that describe the required data transfers, i.e. data shuffle before and after a given application step or function is performed. In essence, the processor (see FIG. 1) observes the current data distribution in the data cube, and determines which sections of the data cube need to be sent out to PEs in the parallel processor.

In a fourth task 48, a third subroutine is called that computes the actual addresses that data must be transferred to and the addresses that data must be transferred from. The scd parameters are employed to help determine how data must be laid out in each of the PE's RAM.

The PEs have identical pieces of RAM set aside for data transfers. This facilitates the determination of the appropriate addresses for data transfers by a name server (not shown). Any one of the PEs (see FIG. 1) may be chosen as the name server. The present high level software accesses the RAM on the name server processor to facilitate a determination of how data is to be distributed or spread in each PE's RAM.

In a fifth task 50, a fourth subroutine is called to format send mapping related instructions obtained in the fourth task 48 to be used by a conventional direct memory access (DMA) engine. The DMA engine facilitates the actual transferring of data among the PEs. The formatted instructions are stored in the send parameters, send synch parameters, and the tprep parameters in the data movement description structure.

In a sixth task 52, a fifth subroutine is called to format receive mapping related instructions obtained in the fourth task 48 to be used by the direct memory access engine. The formatted instructions are stored in the receive parameters, the receive sycn parameters, and the rprep parameters in the data movement description structure. The function sml_mcos_xfer_gen( ) returns with the data movement description structure completed.

Figure 4:
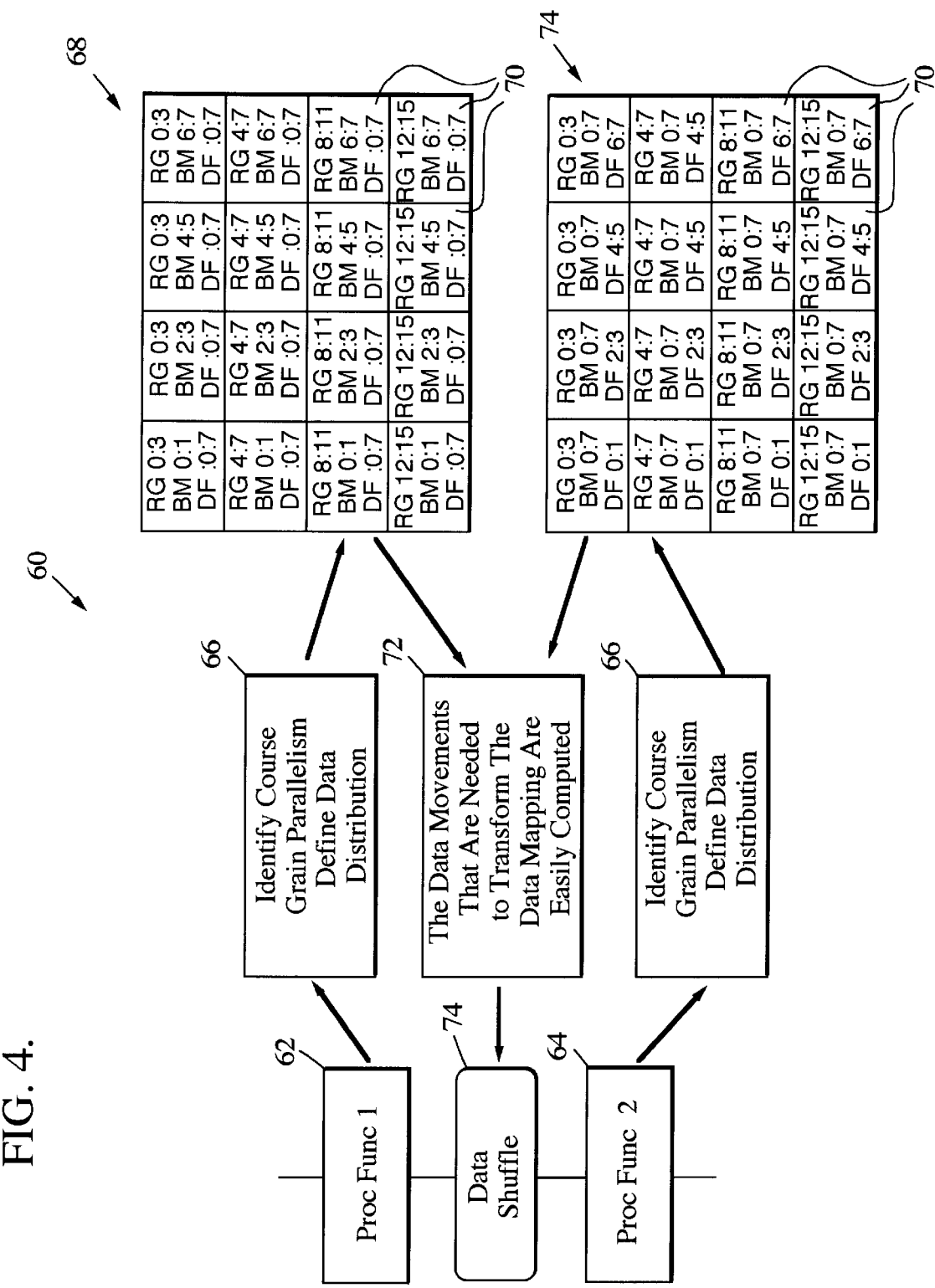
FIG. 4 is a diagram illustrating data communications between a first algorithm step and a second algorithm step using the method of FIG. 2.

FIG. 4 is a diagram 60 illustrating data communications between a first algorithm step 62 and a second algorithm step 64 using the method of FIG. 2. The first algorithm step 62 and the second algorithm step 64 correspond to a first function and a second function respectively, in a given application. The first function 62 accesses the data movement description structure and identifies the current data distribution in a task 66. The data distribution is shown as a first data mapping 68 that specifies the data that is to be mapped to each PE 70. In the present specific embodiment, the mapping 68 is for a parallel processor (not shown) having sixteen PEs 70.

Data movement instructions required for redistributing data among the PEs 70 for the second function 62 are then computed by the high level software of the present invention in an instruction generation task 72. These instructions are then sent to a direct memory access engine that performs the actual data shuffle.

The reorganized data is shown in a second data mapping 74. This reorganized data is organized for use by the second function 64 which uses this data. The organization of the reorganized data is provided in the data distribution task 66 as shown in the second data mapping 74. This mapping 74 is then sent to the instruction generation task 72 that generates data movement instructions required by the next processing function. For illustrative purposes, the next processing function is the first function 62.

Figure 5:
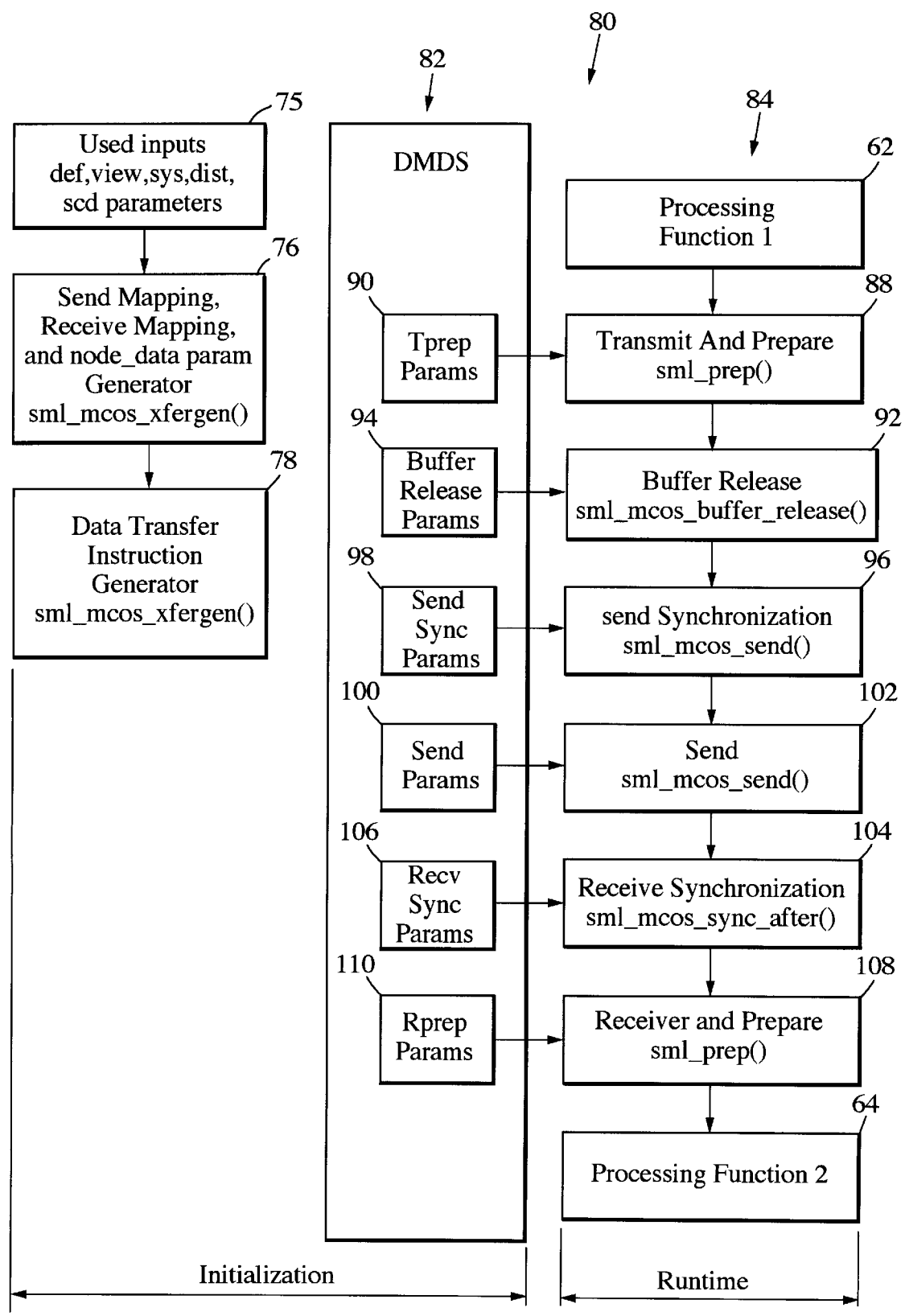
FIG. 5 is a diagram of the system of the present invention illustrating runtime communication and synchronization between the algorithm steps of FIG. 4.

FIG. 5 is a diagram 80 of the system of the present invention illustrating runtime communication and synchronization between the first processing function 62 and the second processing function 64 of FIG. 4. User inputs 75 which include def, view, sys, dist, and scd parameters are converted into a send mapping and a receive mapping by a send mapping, receive mapping and node_data parameter generator 76 that calls the function sml_mcos_xfergen( ). The send mapping and receive mappings include information from the node_data parameters in addition to the user input parameters.

Next, a data transfer instruction generator 78 generates the transfer list from the send mapping and the receive mapping, and creates a data movement description structure 82 by calling the function sml_mcos_xfergen( ). Data movement instructions contained in parameters 90, 94, 98, 100, 106, and 110 in the data movement description structure (DMDS) 82 provide information to runtime data transfer and synchronization functions 88, 92, 96, 102, 104, and 108 for a processing sequence 84.

The processing sequence 84 illustrates tasks performed between the execution of the first processing function 62 and the execution of the second processing function 64. Data is prepared for transmitting to the second processing function 64 after it is used by the first processing function 62. The second processing function 64 is performed on a different computer (not shown). Initial preparations are performed in a transmit prepare task (tprep) 88, if the initial preparations are required. In the tprep task 88, a routine called sml_prep( ) is called. Sml_prep( ) uses tprep parameters 90 to ensure that data to be transferred is contiguous. If the data is not contiguous, the data is reorganized so that it is contiguous.

Next, in a buffer release task 92, a routine called sml_mcos_buffer_release( ) is called. Sml_mcos_buffer_release ( ) uses buffer release parameters 94 to notify other PEs (not shown) that it is ready to receive data for the execution of the first function 62.

Subsequently, in a send synchronization task 96, send synch parameters 98 are used by a sml_mcos_send( ) routine to check that all of the PEs (not shown) that are to receive the data are ready to receive data, i.e. have released their buffers. The sml_mcos_send( ) routine also uses send parameters 100 in a send task 102 to facilitate the actual sending of data to the receiving PE(s) (not shown) that require the data to execute the second processing function 64. Sml_mcos_send( ) uses a conventional DMA to facilitate the transfer of data between PEs.

Then, in a receive synchronization task 104, recv sync parameters 106 are used by a sml_mcos_sync_after( ) routine to ensure that all of the required data has been successfully transferred to the receiving PE(s).

Finally, in an rprep task 108, the incoming data that is to be transferred for use by the second processing function 64 is checked to see that it is contiguous with the aide of rprep parameters 110. If the data is not contiguous, it is reorganized before it is passed on to the second processing function 64.

All of the above mentioned routines may be obtained from Hughes Aircraft Company in California.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for automating data distribution in a parallel processing system comprising:
   first means for providing system characteristics for a parallel processing system having multiple processors; and
   second means for analyzing said characteristics with respect to an application program and controlling communication between said processors in response thereto, wherein said second means includes
   (i) means for communicating data between said processors in response to steps in the application program and in accordance with system characteristics,
   (ii) layout means for generating a data map that specifies the layout of data in each of said processor's memory in accordance with said data distribution parameters, (iii) means for generating a communication map that specifies inter-processor communications required between a first algorithm step and a second algorithm step in said application program in accordance with said data map, and
(iv) means for synchronizing the communication of data between said processors with said steps in said application program, including processing means for generating instructions in accordance with said communication map for redistributing said data prior to said second algorithm step.

2. The invention of claim 1 wherein said first means includes means for determining system size and memory characteristics.

3. The invention of claim 2 wherein said means for determining system size and memory characteristics includes means for obtaining user inputs that specify data distribution parameters.

4. The invention of claim 3 wherein said data distribution parameters include parameters that describe node level data organization among said processors.

5. The invention of claim 1 wherein said instructions are stored in a programming language structure included in software included in said system.

6. A system for facilitating the sharing of processing tasks and memory among processors used to run an application comprising:

input means for obtaining user inputs that specify data distribution parameters;

layout means for generating a data map that specifies the layout of data in each of said processor's memory in accordance with said data distribution parameters;

communication means for generating a communication map that specifies inter-processor communications required between a first algorithm step and a second algorithm step in said application in accordance with said data map, and for generating instructions in accordance with said communication map for redistributing said data prior to said second algorithm step;

synchronization means for synchronizing data communications between processors; and processing means for storing said instructions and performing said data communications.

7. A system for automating data distribution in a parallel processing system comprising:

first means for providing system characteristics for a parallel processing system having multiple processors and second means for analyzing said characteristics with respect to an application program and controlling communication between said processors in response thereto, said second means including:

layout means for generating a data map that specifies the layout of data in each of said processors' memory in accordance with said data distribution parameters, means for generating a communication map that specifies inter-processor communications required between a first algorithm step and a second algorithm step in said application in accordance with said data map, and processing means for generating instructions in accordance with said communication map for redistributing said data prior to said second algorithm step.

8. A method for automating data distribution in a parallel processing system comprising the steps of:

providing system characteristics for a parallel processing system having multiple processors and analyzing said characteristics with respect to an application program and controlling communication between said processors in response thereto, said step of analyzing further including the steps of:

generating a data map that specifies the layout of data in each of said processors' memory in accordance with said data distribution parameters, generating a communication map that specifies inter-processor communications required between a first algorithm step and a second algorithm step in said application in accordance with said data map, and generating instructions in accordance with said communication map for redistributing said data prior to said second algorithm step.

9. A system for facilitating the sharing of processing tasks and memory among processors used in an application, comprising:

a plurality of data distribution parameters which determine inter-processor communication required between subsequent steps in an application, said plurality of data distribution parameters including def, view, sys, dist and scd parameters; said parameters specific to each respective processing element;

layout means for generating a data map that specifies the layout of data in each of said processing element's memory in accordance with said data distribution parameters, generating a list for a send mapping and a list for a receive mapping specifying the data assigned to each processor element, said layout means including a variety of parameters that correspond to data transfer and synchronization instructions;

communication means for generating a communication map that specifies inter-processor communications required between a first algorithm step and a second algorithm step in said application in accordance with said data map, and for generating instructions in accordance with said communication map for redistributing said data prior to said second algorithm step, using said list for a said mapping and said list for a receive mapping from said layout means to generate a list of parameters that describe required data transfers;

synchronization means for synchronizing data communications between processor elements; and processing means for storing said instructions and performing said data communications.

* * * * *